May 23, 1961  W. J. McNABB  2,985,485
AUXILIARY WHEEL FOR MOTOR VEHICLES
Filed Dec. 30, 1959

INVENTOR.
William J. McNabb
BY
Fearman Fearman & McCulloch
ATTORNEYS

United States Patent Office 2,985,485
Patented May 23, 1961

2,985,485
AUXILIARY WHEEL FOR MOTOR VEHICLES

William J. McNabb, Port Austin, Mich.

Filed Dec. 30, 1959, Ser. No. 862,863

2 Claims. (Cl. 301—38)

This invention relates to an auxiliary wheel for motor vehicles and the like, it being the general object of the invention to provide an auxiliary wheel and mounting to be used as emergency equipment in the event the pneumatic tire fails, or is cut or pierced by an object in the roadway as it is being driven.

Automobiles of the type presently in general use are equipped with pneumatic tires and such tires are of a size that vehicle is rather difficult to operate when the tire is deflated; furthermore, to attempt to drive on a deflated tire even a short distance will quickly ruin said tire, and there is also the possibility of damage to an automobile wheel proper, all of which may require that the wheel be removed and complete wheel and tire assembly be substituted.

So-called spare tires and rims are the same size and construction as are the other rim and tires of the vehicle; however, inasmuch ast damaged rims and/or flat tires are not common, statistics show an average of one each year, this furnishing of a spare tire and rim as presently done is needlessly expensive; and furthermore, the manufacturers' wish to eliminate the spare tire and rim from the car trunk.

It is, therefore, one of the prime objects of the invention to provide a relatively small auxiliary wheel and tire assembly which can be easily mounted on the vehicle without modification, so that it may be driven at a reasonable speed, under its own power to a service station or its destination without loss of time, and without the necessity of calling a repairman for replacement and/or repair.

A further object is to design an auxiliary wheel and mounting composed of few parts, which are relatively light in weight, which are economical to manufacture and capable of being easily applied to use, and which will last over the life span of a number of automobiles.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion and minor details of construction, without departing from the spirit, or sacrificing any of the advantages of the invention.

In the drawing.

Referring now more specifically to the accompanying drawing in which is shown the preferred embodiment of my invention, and in which like reference numerals indicate like parts throughout the several views thereof.

Figure 1:
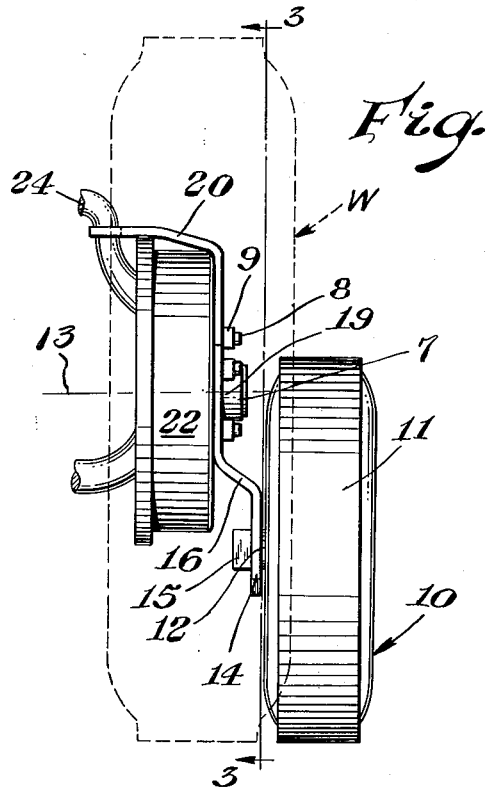
Fig. 1 is a side, elevational view showing, in broken lines, a front wheel with a deflated tire in place, and also showing in solid lines, the device of the present invention in position on the vehicle and ready for operation.
Figure 2:
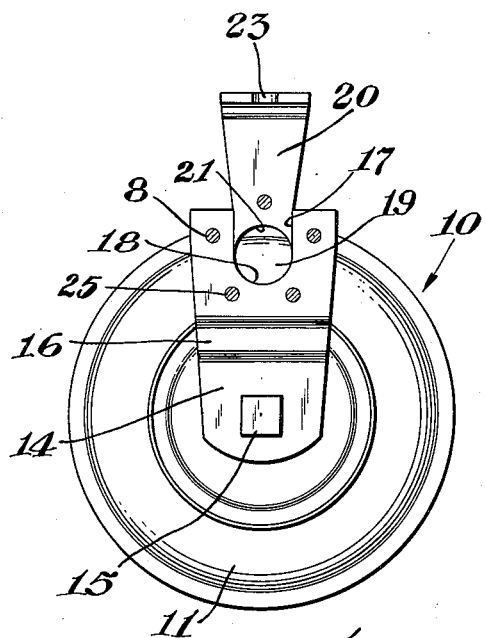
Fig. 2 is an inner face elevational view of the auxiliary wheel and its mounting.
Figure 3:
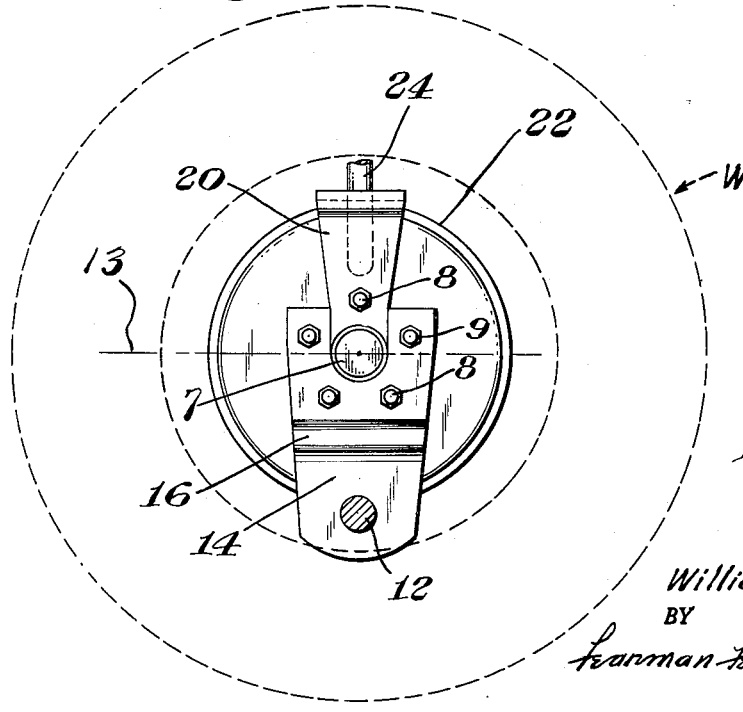
Fig. 3 is a face elevational view taken on the line 3—3 of Fig. 1 and looking in the direction of the arrows.

The letter W indicates a conventional wheel rim and pneumatic tire assembly such as is presently in general use, said rim being detachably secured to the front wheel hub 7 which is provided with a plurality of projecting lugs 8, disposed in predetermined pattern, which register with a similar hole pattern provided in the conventional wheel rim, and by use of nuts 9 this wheel rim and its pneumatic tire is firmly mounted and secured in position on the hub. When the pneumatic tire is punctured or otherwise damaged and is deflated or the rim damaged, the vehicle cannot be driven without ruining the tire, and it is therefore removed by first unscrewing the nuts 9 so that the rim and tire W are removable as a unit.

My auxiliary wheel mounting means is designed for mounting in exactly the same manner as above described, no modification is required, the same lugs and nuts being utilized for securing the auxiliary wheel in position.

This auxiliary wheel assembly comprises a small wheel 10 having a pneumatic tire 11 and an axle 12, the axis of which is located at a point below the axis 13 of the conventional wheel W, said auxiliary wheel being considerably smaller than the conventional wheel and is much cheaper to manufacture and use, and whereas wheel designs, etc. change on many models, this in no manner affects my auxiliary wheel because it is a complete unit and requires only that the lug pattern be the same.

An adaptor plate 14 is welded or otherwise rigidly connected to the squared end 15 of the axle 12; said plate being offset as at 16 to provide necessary clearance to permit removal and/or replacement of the nuts 9; thence the plate extends upwardly and is formed with an open slotted passageway 17 terminating in a rounded seat 18 which accommodates the outer end of the hub 19.

An anchor bar or plate 20 forms an extension of the adaptor plate 14, the lower end of which is of a width to be accommodated in the slot 17 and is rounded as shown at 21 to accommodate the axle hub 19 which extends therethrough; thence the anchor bar extends upwardly and over the brake drum 22, the upper end being slotted as at 23 to engage the brace 24 of the vehicle.

A plurality of lug openings 25 are provided in the adaptor plate and anchor bar, these openings being spaced to register with an form a pattern exactly the same as is required for the conventional wheel mounting, such arrangement permits the plate and bar to be tightly clamped against the face of the hub, and the same nuts 9 used for the wheel are used to mount and secure the auxiliary wheel in place.

While the instant auxiliary wheel is designed for use on the front wheels of "Ford" automobiles, it will be readily understood that it can, with very slight modification, be fitted to all other makes of cars.

It will, of course, be understood that various constructions or fastening means may be employed for connecting the wheel rim to the hub, this being a matter of the manufacturer's choice, and the auxiliary wheel mount can be manufactured to coincide therewith without departing from the invention.

What I claim is:

1. An auxiliary wheel and mount for attachment to a hub assembly which normally carries a vehicle wheel comprising, a relatively small auxiliary wheel and axle assembly, the axis of which is located below the horizontal axis of the conventional wheel assembly; a vertically-disposed adaptor plate, offset at a point intermediate its length, with the offset section spaced a predetermined distance from the auxiliary wheel and rigidly connected at its lower end to said axle, an open hub accommodating slotted passage in the upper end of said adaptor plate, an anchor bar having its lower end accommodated in said slotted passage with its upper end turned at substantially right angles to the main body and having an open slot in the end thereof releasably engageable with a brace rod of the vehicle, and registering securing means in said hub, plate, and anchor bar respectively for rigidly securing said auxiliary wheel in position on said hub assembly.

2. The combination defined in claim 1 in which the adjoining ends of the adaptor plate and anchor bar are shaped to form when in assembled position, a bearing to accommodate the conventional wheel hub therein.

References Cited in the file of this patent

UNITED STATES PATENTS

| | | |
|---|---|---|
| 1,205,155 | Burns | Nov. 21, 1916 |
| 1,671,311 | Pfarr | May 29, 1928 |
| 2,479,421 | Sempe | Aug. 16, 1949 |